Jan. 11, 1966   P. S. DELL'ARIA ETAL   3,229,292
SNORKEL SIMULATOR

Filed March 6, 1962   3 Sheets-Sheet 1

INVENTORS
PAUL S. DELL'ARIA
JOHN W. GREER, JR.
RAYMOND MOUNTJOY

BY

ATTORNEY

Jan. 11, 1966     P. S. DELL'ARIA ETAL     3,229,292
SNORKEL SIMULATOR
Filed March 6, 1962     3 Sheets-Sheet 2

INVENTORS
PAUL S. DELL'ARIA
JOHN W. GREER, JR.
RAYMOND MOUNTJOY
BY
ATTORNEY

INVENTOR
PAUL S. DELL' ARIA
JOHN W. GREER, JR.
RAYMOND MOUNTJOY

BY

ATTORNEY

United States Patent Office 3,229,292
Patented Jan. 11, 1966

3,229,292
SNORKEL SIMULATOR
Paul S. Dell'Aria, Arlington, Va., and John W. Greer, Jr., and Raymond Mountjoy, Montgomery County, Md., assignors to the United States of America as represented by the Secretary of the Navy
Filed Mar. 6, 1962, Ser. No. 178,225
16 Claims. (Cl. 343—18)
(Granted under Title 35, U.S. Code (1952), sec. 266)

The invention described herein may be manufactured and used by or for the Government of the United States of America for governmental purposes without the payment of any royalties thereon or therefor.

The present invention relates to radar countermeasure devices, and more particularly relates to radar countermeasures which are capable of being launched from underwater.

Various systems of underwater-launched radar countermeasure devices have been developed in the prior art and generally operate satisfactorily, but are usually released from a shallow depths and near the surface of the water. However, it has been found desirable to use submarines to launch a radar countermeasure device from great depths as well as from near the surface of the ocean. To this end, the device must be capable of withstanding extreme differences of pressure and still remain operative.

In accordance with the invention, the radar countermeasure device comprises an outer waterproof canister that can be launched from a suitable tube of a submarine. The canister has a cover that can be automatically removed. A balloon carrying a radar countermeasure means and a water-responsive means to inflate the balloon are housed in the canister. After launching, the canister rises slowly, preferably at a predetermined rate, toward the surface of the water. The canister contains means for opening the cover and releasing the balloon when certain operating conditions occur. Specifically this means comprises a depth sensitive means and a timing means. At a predetermined depth the depth-sensitive means triggers the timing means which is preset to time a predetermined period. At the lapse of this period a release means for the cover is actuated so that the balloon and its associated parts become operative.

An object of the invention is to provide a device of a type described that can be launched in any depth of water.

Another object of the invention is to provide a device of a type described that starts its operative cycle at a predetermined depth, regardless of any greater depth from which it is launched.

A further object of the invention is to provide a device of a type described that can be launched from deep depths, but becomes operative after a predetermined interval has elapsed.

Still another object of the invention is to provide an underwater-launched device of a type described having failure-proof parts, so that its intended operation is always assured after launching.

Other objects and many of the intended advantages of this invention will be readily appreciated as the same becomes better understood by reference to the following detailed description when considered in connection with the accompanying drawings therein.

Figure 1:
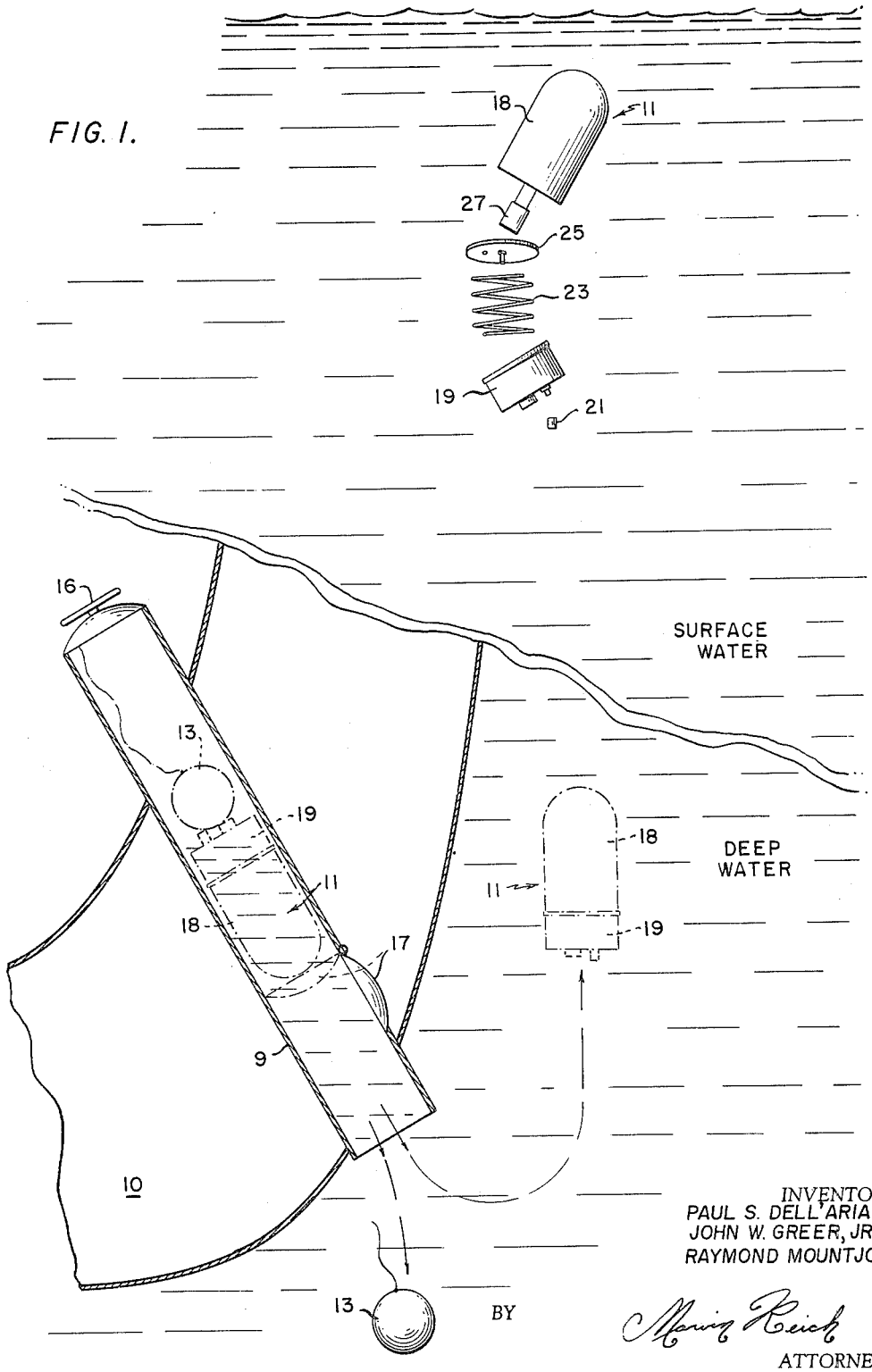
FIG. 1 is a general vertical view of an embodiment of the invention as it rests in a tube of a submerged submarine, as it is ejected from the tube and is rising, and finally as its parts separate at it approaches the surface of the water.

Referring to FIG. 1, an ejection tube 9 is mounted in a hull of a submarine 10. An air-filled canister 11 in accordance with the invention is loaded into the ejection tube 9 head downwards, with a heavy weight or ball 13 loosely placed on the rear of the canister. The tube 9 contains a loading door 16 for loading the canister 11 and the heavy weight 13 therein and an additional door 17 is provided at its lower end as a release door.

The canister 11 comprises an upper housing 18 and a lower control section or mechanism 19 having an outer-cup-shaped housing 20. The control mechanism 19 comprises a pressure sensitive device or means 21 for initiating the timing sequency of a timer contained in the control mechanism 19. While in tube 9, the ball 13 rests on the unit. The canister 11 is also provided with a compressed helical spring 23 and an inner cover 25 for the section 19. Upon reaching the proper depth and after a predetermined time interval, as determined by mechanism 19, an ejecting spring 23 separates the housing 18 from the control mechanism 19. After this separation water rushes into the housing causing gas generator 27 to generate hydrogen gas which inflates the balloon 28 causing it to leave the housing 18. The coordination of the various parts will be better understood from the drawings and detailed description following:

Referring to FIGS. 2-7, the outside of the canister 11 is preferably painted in a camouflaged manner. The canister comprises upper housing 18, lower control section 19, a pressure sensitive means 21, and a watertight housing 33 at the bottom of control section 19, the housing 33 being watertightly closed by a cover 31. The housing 33 surrounds an adjustable time-setting knob 35 from a timing mechanism subsequently described. The housing 33 and the cover 31 are provided with O rings 34 to make the housing and cover watertight when the two are in a closed position, as shown in the drawing in FIG. 4.

In order to prevent any triggering of the device while it is in storage or is being handled, a safety pin 37 (see FIG. 4) is provided for the pressure-sensitive device 21. The pin 37 is to be pulled out before the countermeasure device is placed into the ejection tube 9.

The pressure-sensitive device 21 comprises a weight 40 in the form of a steel cylindrical block which is solid except for the holes for the pin 37 and a cylindrical hole for a hollow shaft or journal 41 slidably but closely receiving a rod or pin 43. The journal 41 is watertightly secured to the bottom of housing, and is loosely covered by the weight 40, being held in place by safety pin 37. The rod 43 is fastened to weight 40 as by lower screw-threads shown in FIG. 4. The pin 43 has an upper end that can slidably but closely ride in a hole in the cover 20 and housing 41. Accordingly the upper end of the rod 43 is exposed to the pressure within control section 19, and canister 11, which is preferably approximately atmospheric pressure.

When the countermeasure device is first ejected from tube 9, it assumes the vertical position shown in broken lines in the lower right of FIG. 1. In this position weight 40 (including the rod 43) tends to drop and separate from the rising canister. However, at deeper depths of the canister, the water pressure on the bottom of weight 40 tends to counteract the pull of gravity and other holding forces on the weight until the canister has risen enough to decrease the water pressure sufficiently to permit the weight to drop. For a given material by varying the size of the effective area of weight 40 exposed to this water pressure, the depth at which the weight separates from section 19 can be controlled. Obviously, the larger this area, the higher the canister will rise before the weight 40 and rod 43 disengages from central section 19.

In the present embodiment the weight 40 and rod 43 are designed to be such that they will disengage from the control section 19 at approximately 150 feet below the surface of the water. It is to be understood, however, that the area and weight of the weight 40 and the rod 43 can be so predetermined that this disengagement will occur at any desired depth below the surface of the water.

When the weight 40 and rod 43 leave the control mechanism 19, the rod 43 exposes chamber 44 to surrounding hydrostatic pressure. Thus water fills the chamber 44, and moves piston 47 having an extending shaft or starting trigger 49 that triggers or actuates a timing mechanism 51 into operation. Hence, the weight 40 the rod 43, the piston 47 and cooperating parts comprise the pressure-sensitive means or device 21 that goes into action for triggering timing mechanism 51 at a predetermined hydrostatic pressure representative of a predetermined depth below the surface of the water.

Figure 4:
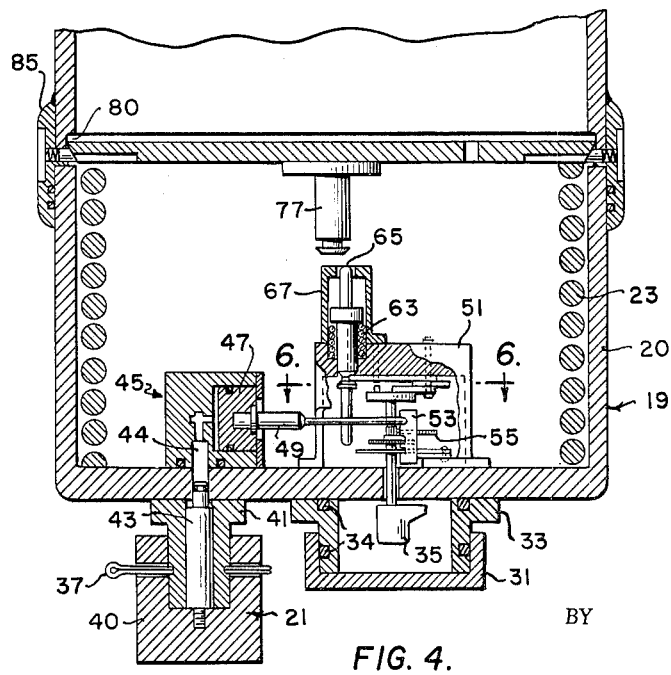
FIG. 4 is a sectional view of a timing and triggering mechanism utilized in the lower part of the device of FIG. 2.
Figure 6:
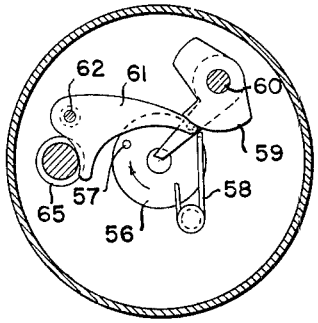
FIG. 6 is a sectional view, taken on lines 6—6 of FIG. 4.

The timing mechanism 51 upon actuation times a period of delay before separating the upper housing 18 from the lower central section 19 of the canister 11 after the canister has risen to the depth to which it is set. This added time permits a launching vessel to move away from the area of launching before the balloon 28 is released through separation of housing 18 and control section 19. The timing mechanism 51 is provided with a start lever 53 which the trigger 49 pushes against in order to actuate the timing mechanism to start its timing cycle. The lever 53 releases a clock mechanism 55 which is any suitable mechanism of the prior art and therefore needs no other description except to say that it will measure a predetermined amount of time which is set on the control knob 35 of the timing mechanism. Attached to the clock mechanism 55 (FIG. 6) is a wheel 56 with a pin 57; and as time mechanism operates the wheel 56 carries the pin 57 with it. A spring 58 is placed into position to hold a bell crank with an upper cam surface 59 normally holding a lever 61 so that the lever will not move. The bell crank with the upper cam surface 59 is pivoted on a mounting post 60 so that it rotates when engaged by pin 57. The lever 61 is held by the bell crank 59, but rotates counterclockwise when released from cam surface 59 by rotating of the last. Rotation of lever 61 releases a triggering means comprising a compression spring 63 and a trigger rod 65 held cocked by the spring 63. In cocked position of trigger rod 65, lever 61 is in a groove of the rod. Rotation of lever 61 removes it from the groove and permits springs 63 to force rod upward (FIG. 4).

The trigger rod 65 is housed in a trigger housing 67 which guides the rod so that it will always hit the proper part of a release lever 70 (FIGS. 2, 4 and 5), the lever 70 being a part of a release mechanism for separating the housing 18 and section 19 at the end of the time delay introduced by the timing mechanism 51 after actuation of the pressure-sensitive means 21. During this time delay the canister 11 still rises, by virtue of its net positive buoyancy.

The lever 70 is carried by a structure comprising a post 71 which is fixed to the bottom wall of the control housing 19. A cam lever 73 is pivoted on the upper part of post 71, and is biased by a tension spring 75 having an end secured to post 71. Immediately above post 71 is a second post 77 that is removably screwed to and extends from the cover 25 inside the canister 11. The cam lever 73 sits in a groove of post 77 for holding the post 77 and hence cover plate 25 in the position shown in FIG. 2 and against the action of compression spring 23. Upon release, lever 70 is triggered by the trigger 65 under the influence of spring 63 in housing 67. A support 81 attached to post 71 is provided to hold the release lever 70.

When the release mechanism comprising post 77 is released, spring 23 pushes cover 25 upwardly in a groove 80 in the inside bottom of upper housing 18.

Figures 2, 5, 7:
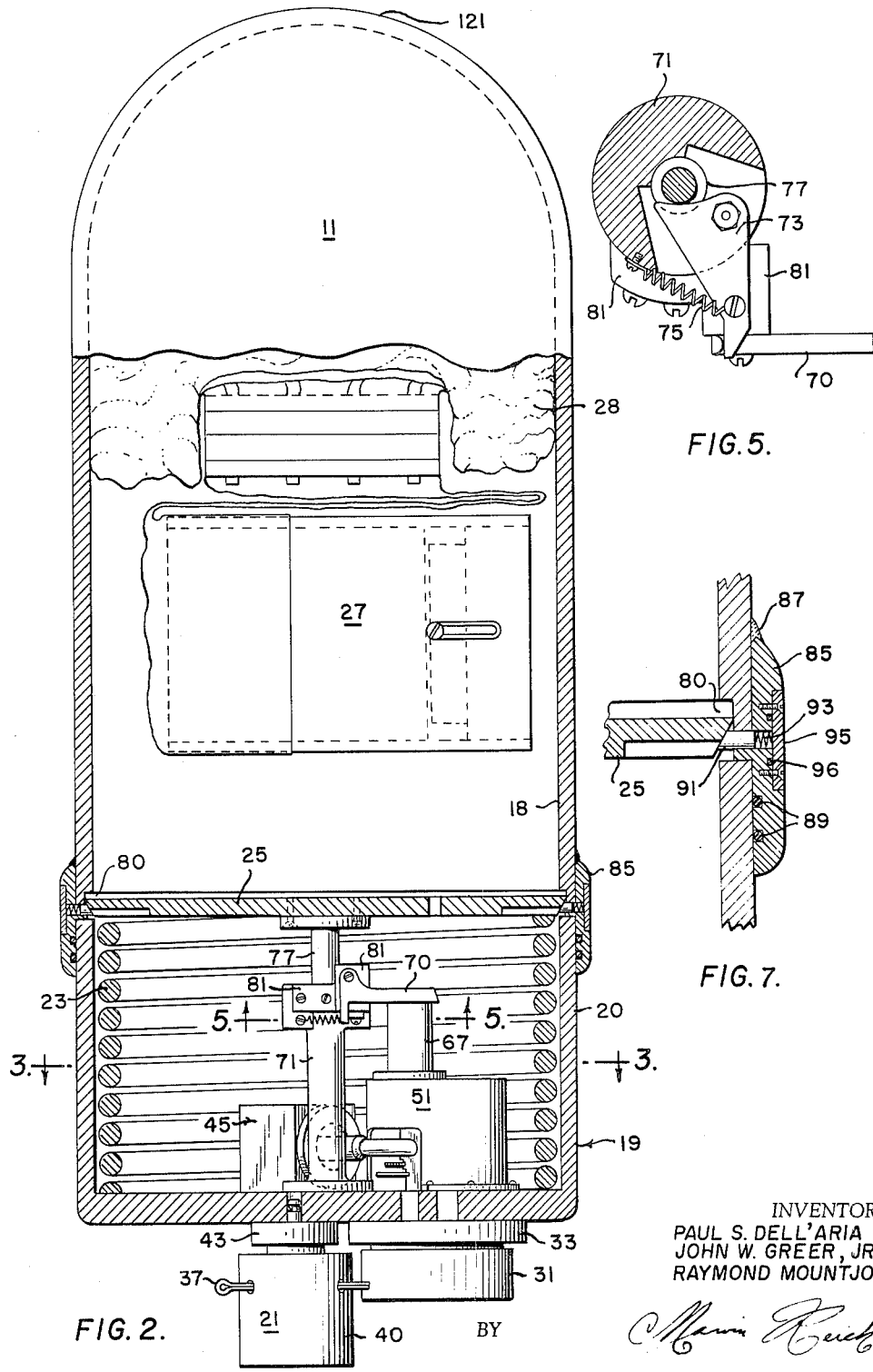
FIG. 2 is a sectional view of an embodiment of the invention.
FIG. 5 is a sectional view of a releasing mechanism utilized in the device of FIG. 2 taken on lines 5—5 of FIG. 2.
FIG. 7 is a sectional view of locking pins and mechanism which hold parts of the canister together.
Figure 3:
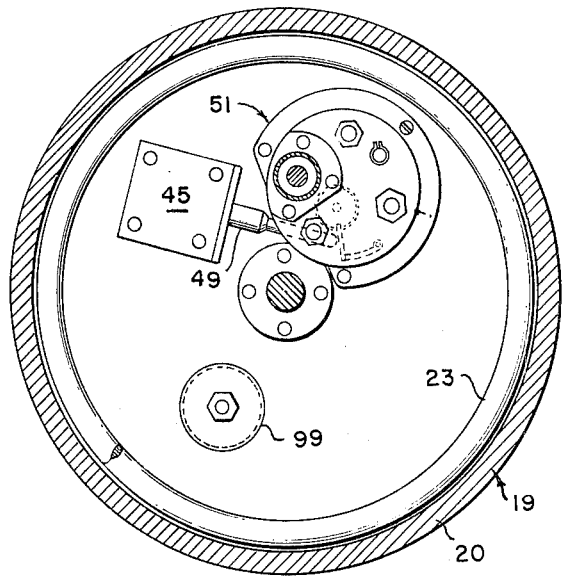
FIG. 3 is a sectional view of the device of FIG. 2, taken on line 3—3 of FIG. 2.
Figure 8:
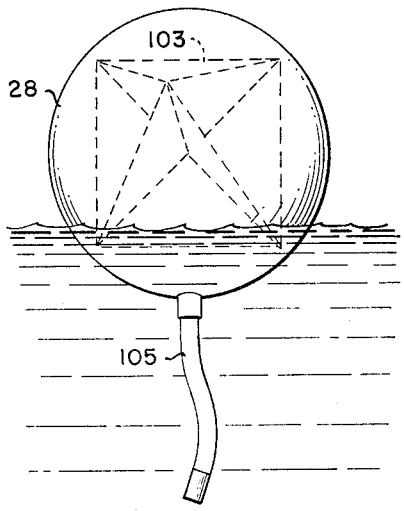
FIG. 8 is a view illustrating a radar countermeasure balloon that has reached the surface.

Before release, the cover 25 is held in position by a securing means comprising an outer ring 85 spanning the joint between housing 18 and control section 19, as shown in FIGS. 2 and 7.

The ring 85 is permanently welded to the outside of housing 18 by a circumferential watertight weld 87. The lower part of the ring 85 is provided with O rings 89 so as to be removably watertight against the control housing 19. The ring 85 is provided with a plurality of circumferentially-spaced holes each receiving a pin 91 and a compression spring 93 which biases the associated pin 91 in contacting relationship with the cover 25. The outer surface of cover plate 25 and the contacting surface of pins 91 are matingly tapered as shown in FIGS. 2 and 7.

The ring 85 has a plurality of circular grooves that removably watertight receive closing plates 95 for providing abutments for springs 93. Each plate 95 may be fitted in its groove in the position as shown in FIG. 7, over a circular sealing O-ring 96, and screwed in place.

In the assembly of the equipment thus far disclosed the parts associated with section 19 are put in cocked operation position. The collapsed balloon assembly and gas-generator are placed in housing 18. The post 77 is secured to the cover plate 25 and the cover placed in position in the groove at the end of housing 18 where the cover is held by pins 91. The completed section 19 is then slipped into ring 85 having a shoulder against which the end of section 19 abuts. Lever 73 is biased by spring 75 towards post 77, and because of the smaller tapered end of this post (FIG. 4) enters the groove there and thereby locks the section 19 and housing 18 together. The knob 35 may be adjusted before or after the assembly of housing 18 and section 19.

There are holes in the cover plate 25 to permit any gas-accumulation within to reach a protective relief valve 99 (FIG. 3) which is secured to the bottom wall of section 19 for releasing gas from the canister should the pressure build up therein. Preferably the valve 99 operates at a low pressure differential as for example, two pounds per square inch of excess pressure in the canister 11 over external atmospheric pressure.

The balloon assembly in the housing 18 comprises the gas-generator 27, the collapsed balloon 28 within which is a collapsed radar corner reflector 103. A balloon with an internal expansible reflector such as disclosed in Patent No. 2,463,517 of March 8, 1949 may be used. A gas generator such as disclosed in Patent No. 2,909,119 of October 20, 1959, or in copending application Serial No. 85,934, filed January 30, 1961 may be used. The gas-generator is connected to the collapsed balloon by a tubing 105.

In the operation of the assembled countermeasure device, the delay period of the timing mechanism 51 is first set by removing cover 31, adjusting knob 35 and then replacing the cover 31. The safety pin 37 is then removed; and the device placed in the ejection tube 9 with housing 18 downward. The device is inserted through open door 16, with release door 17 closed. A weight 13, sufficient in weight to force the canister to be ejected when the release door 17 of the ejection chamber of tube 9 is opened, is placed on the end of the canister 11 forcing it downward, and the door 16 closed.

When the device is to be discharged, the door 17 is opened, and weight 13 forces the device out of the tube 9 after which the weight 13 sinks to the bottom of the ocean. As soon as the canister is free of the submarine hull it begins to rise by virtue of its positive buoyancy and with section 19 downward, it being the heavier end of the device. In a preferred embodiment, the canister is designed to have a half-pound positive buoyancy, and the top of housing 18 is rounded. The top of housing 18 is rounded to avoid it becoming hung on edges of door 17. The pressure-sensitive means 21 is predetermined to permit weight 40 to free itself from section 19 when the canister has risen to about 150 feet or less below the water's surface. The falling weight 40 exposes chamber 44, so that water rushes into chamber 44 causing rod 49 to start the timing mechanism 51. It is to be noted however, that the pressure sensitive means will immediately actuate the timing mechanism if the canister is launched from any depth which is less than 150 feet from the surface. For any greater depth than 150 feet the weight 40 remains on the canister as the latter rises until the 150 foot depth is reached. At this depth in the embodiment described the weight will disengage. Upon actuation, the timing mechanism 51 will measure the time delay original set through knob 35. The canister 11 continues to ascend towards the surface of the water at approximately 2 to 3 feet a second in the preferred embodiment and upon reaching the surface floats with about an inch of the camouflaged top of the housing 18 exposed above the surface of the water. The timing mechanism 51 operates the lever 61 at the desired time thereby releasing the trigger 65 which thereupon moves upwardly and actuates the releasing mechanism which holds the cover post 77 and the control housing 71 together, so that spring 23 separates the control mechanism 19 and housing 18.

The area of the bottom of the control mechanism 19 and the stiffness of the spring 23 are so designed that the housing 18 and the control housing 19 will not separate unless the depth of the water is approximately less than 7 feet. If the depth is any greater than that, the canister 11 will not separate until the depth is reached because the spring 23 cannot overcome the outside hydrostatic pressure.

Assuming that the canister is at a depth to separate, then the spring 23 forces the canister cover plate 25 upwardly in its groove, thereby releasing pins 91 from engagement with the cover. When the pins 91 are released, the pin springs 93 force the pin out of their holes. This leaves the cover 25 free to fall off and sink after the heavy control mechanism 19 is separated from the housing 18. Water then rushes into the housing 18, causing the housing simultaneously to lay over on its side. As this happens the incoming water enters the gas generator 27 which generates hydrogen gas. The hydrogen gas is fed from the generator through the tube 105 to the balloon 28. Inflating the balloon 28 forces the balloon 28 out of the housing 18 and the housing 18 is then free to sink. The generator continues to generate gas in a sufficient quantity to completely inflate the balloon 28. The inflating ballooon 28 erects the radar corner reflector 103 which may be designed to reflect radar similarly to a submarine snorkel. The inflated balloon will float on the surface of the water.

Obviously many modifications and variations of the present invention are possible in the light of the above teachings. It is therefore to be understood that within the scope of the appended claims the invention may be practiced otherwise than as specifically described.

What is claimed is:

1. Apparatus for launching a radar countermeasure device from great depths in the ocean as well as from near the surface comprising:
    (a) a housing adapted to be launched from a submarine;
    (b) a countermeasure device;
    (c) said countermeasure device being releasably housed in said housing;
    (d) a substantially silent non-explosive spring actuated control mechanism for controlling the release of said countermeasure device;
    (e) said substantially silent non-explosive spring actuated control mechanism being part of said housing and operative to release said countermeasure device whereby the countermeasure device can be launched from a submarine working extremely deep water.

2. An apparatus for launching a radar countermeasure device from great depths as defined in claim 1 but further characterized by said substantially silent control mechanism comprising a time delay means for delaying the time when the control means operates to release said countermeasure device after launching.

3. An apparatus for launching a radar countermeasure device from great depths as defined in claim 2 but further characterized by said radar countermeasure device being an inflatable balloon containing a radar corner reflector.

4. An apparatus for launching a radar countermeasure device from great depths as defined in claim 1, wherein said substantially silent non-explosive spring actuated control mechanism includes a time delay mechanism, and a depth control mechanism for controlling the actuation of said time delay mechanism.

5. An apparatus for launching a radar countermeasure device from great depths as defined in claim 4 but further characterized by said radar countermeasure device comprising an inflatable balloon containing a radar corner reflector.

6. An apparatus for launching a radar countermeasure device from great depths in the ocean as well as near the surface comprising:
    (a) a housing;
    (b) a radar countermeasure device;
    (c) said radar countermeasure device being housed in said housing;
    (d) a cover for said housing;
    (e) said cover for said housing being connected to said housing;
    (f) a substantially silent controlled release means for releasing said cover from said housing;
    (g) said cover release means being attached to said cover.

7. An apparatus for launching a radar countermeasure device from great depths as defined in claim 6 and further characterized by said radar countermeasure device comprising an inflatable balloon with a corner reflector therein.

8. An apparatus for launching a radar countermeasure device from great depths as defined in claim 7 wherein:
    (a) said substantially silent control release means contains a time delay means, said control release means being actuated by said time delay means.

9. An apparatus for launching a radar countermeasure device from great depths as defined in claim 8 wherein said substantially silent control release means contains a pressure sensitive triggering means for actuating said time delay means.

10. An apparatus for launching a radar countermeasure device from great depths as defined in claim 6 wherein said substantially silent control release means contains a time delay means which is actuated by a pressure sensitive means.

11. An apparatus for launching a radar countermeasure device from great depths as defined in claim 10 but further characterized by:
    (a) said radar countermeasure comprising an inflatable balloon containing a radar corner reflector;
    (b) a gas generator for generating gas;
    (c) said gas generator being connected to said inflatable balloon.

12. An apparatus for launching a radar countermeasure device from great depths as defined in claim 6 wherein:

(a) said radar countermeasure is an inflatable balloon containing a radar corner reflector;
(b) a gas generator for generating gas;
(c) said gas generator being connected to said inflatable balloon.

13. An apparatus adapted for launching from great depths in the ocean, a device providing radar reflections for simulating a submarine snorkel comprising:
(a) a housing;
(b) an inflatable balloon;
(c) said balloon containing a radar corner reflector which is erected upon inflation of said balloon;
(d) said ballooon and reflector being housed collapsed in said housing;
(e) a water-responsive gas-generating means;
(f) said water-responsive gas-generating means being housed in said housing and operatively connected to said inflatable balloon;
(g) a housing cover;
(h) a cover control mechanism;
(i) said cover control mechanism having a time-responsive means and a pressure-responsive means;
(j) said cover control mechanism having an outer housing, said control mechanism housing supporting said time-responsive means and said pressure-responsive means;
(k) holding pins;
(l) said holding pins holding said housing cover to said housing;
(m) holding means for holding said control mechanism housing to said housing cover; and
(n) means operable for causing said control mechanism housing and said housing cover to separate the last said means being housed in said control mechanism housing;
(o) said holding means comprising separable parts connected to said cover and said release mechanism housing, said separable parts being separable by operating said pressure-sensitive means and said timing-means.

14. An apparatus for launching a radar countermeasure device from great depths as defined in claim 13 but further characterized by said pressure-responsive means comprising a metallic body with the area of the bottom of the body determining the depth at which said pressure sensitive means triggers said timing means.

15. An apparatus for launching a radar countermeasure device from great depths as defined in claim 14 but further characterized by said time responsive means comprising mechanical clock mechanism which can be adjustably set for variable periods of time.

16. An apparatus for launching a radar countermeasure device from great depths as defined in claim 13 but further characterized by said time means comprising mechanical clock mechanism which can be adjustably set for variable periods of time.

References Cited by the Examiner

UNITED STATES PATENTS

| | | | |
|---|---|---|---|
| 2,465,993 | 4/1949 | Beechlyn | 343—18 |
| 2,470,783 | 5/1949 | Mead | 343—18 X |
| 2,705,919 | 4/1955 | Semon | 102—16 X |
| 2,888,675 | 5/1959 | Pratt | 343—18 |
| 2,968,053 | 1/1961 | Gogolick | 116—27 X |

LEWIS H. MYERS, *Primary Examiner.*

CHESTER L. JUSTUS, *Examiner.*

J. W. MILLS, J. P. MORRIS, *Assistant Examiners.*